United States Patent
Brehm et al.

(10) Patent No.: US 6,652,267 B1
(45) Date of Patent: Nov. 25, 2003

(54) BURNER FOR THE PARTIAL OXIDATION OF LIQUID FUELS WHICH CONTAIN CARBON

(75) Inventors: Lothar Brehm, Frankfurt am Main (DE); Waldemar Liebner, Oberursel (DE); Gunter Quass, Frankfurt am Main (DE); Uwe Zwiefelhofer, Neu-Anspach (DE)

(73) Assignee: Metallgesellschaft AG, Frankfurt am Main (DE)

( * ) Notice: Subject to any disclaimer, the term of this patent is extended or adjusted under 35 U.S.C. 154(b) by 0 days.

(21) Appl. No.: 10/030,197
(22) PCT Filed: May 25, 2000
(86) PCT No.: PCT/EP00/04755
§ 371 (c)(1),
(2), (4) Date: May 6, 2002
(87) PCT Pub. No.: WO01/04047
PCT Pub. Date: Jan. 18, 2001

(30) Foreign Application Priority Data

Jul. 7, 1999 (DE) .......................................... 199 31 373

(51) Int. Cl.$^7$ ............................ F23D 11/36; F27B 3/00; B05B 15/00
(52) U.S. Cl. ........................ 431/160; 431/159; 432/174; 110/182.5; 122/6.6; 137/335; 239/132.3
(58) Field of Search .................................. 431/160, 159; 432/174; 110/182.5; 122/6.5, 6.6; 137/335; 239/132.3

(56) References Cited

U.S. PATENT DOCUMENTS

| | | | | | |
|---|---|---|---|---|---|
| 4,351,645 | A | * | 9/1982 | Marion et al. ................. | 48/61 |
| 4,666,397 | A | * | 5/1987 | Wenning et al. ............ | 431/160 |
| 4,736,693 | A | * | 4/1988 | Clomburg, Jr. ............. | 110/263 |
| 4,887,800 | A | * | 12/1989 | Hotta et al. ................. | 266/270 |
| 5,904,477 | A | * | 5/1999 | Van Dam et al. ........... | 431/159 |

* cited by examiner

Primary Examiner—Alfred Basichas
(74) Attorney, Agent, or Firm—Norris McLaughlin & Marcus

(57) ABSTRACT

The burner has at least two fuel-carrying tubes which are arranged in parallel, the distance between adjacent fuel-carrying tubes being 5 to 30 cm. Each fuel-carrying tube is surrounded by a steam-carrying tube, which at its orifice end has a supply line for oxygen-containing gas. The steam-carrying tubes are surrounded by a common first cooling chamber through which cooling liquid is passed, the first cooling chamber constituting an annular chamber and extending into the area of the orifice ends of the steam-carrying tubes. Coaxial to the first cooling chamber a common second cooling chamber preferably is provided, which is surrounded by the first cooling chamber.

7 Claims, 2 Drawing Sheets

BURNER FOR THE PARTIAL OXIDATION OF LIQUID FUELS WHICH CONTAIN CARBON

DESCRIPTION

Figure 1:
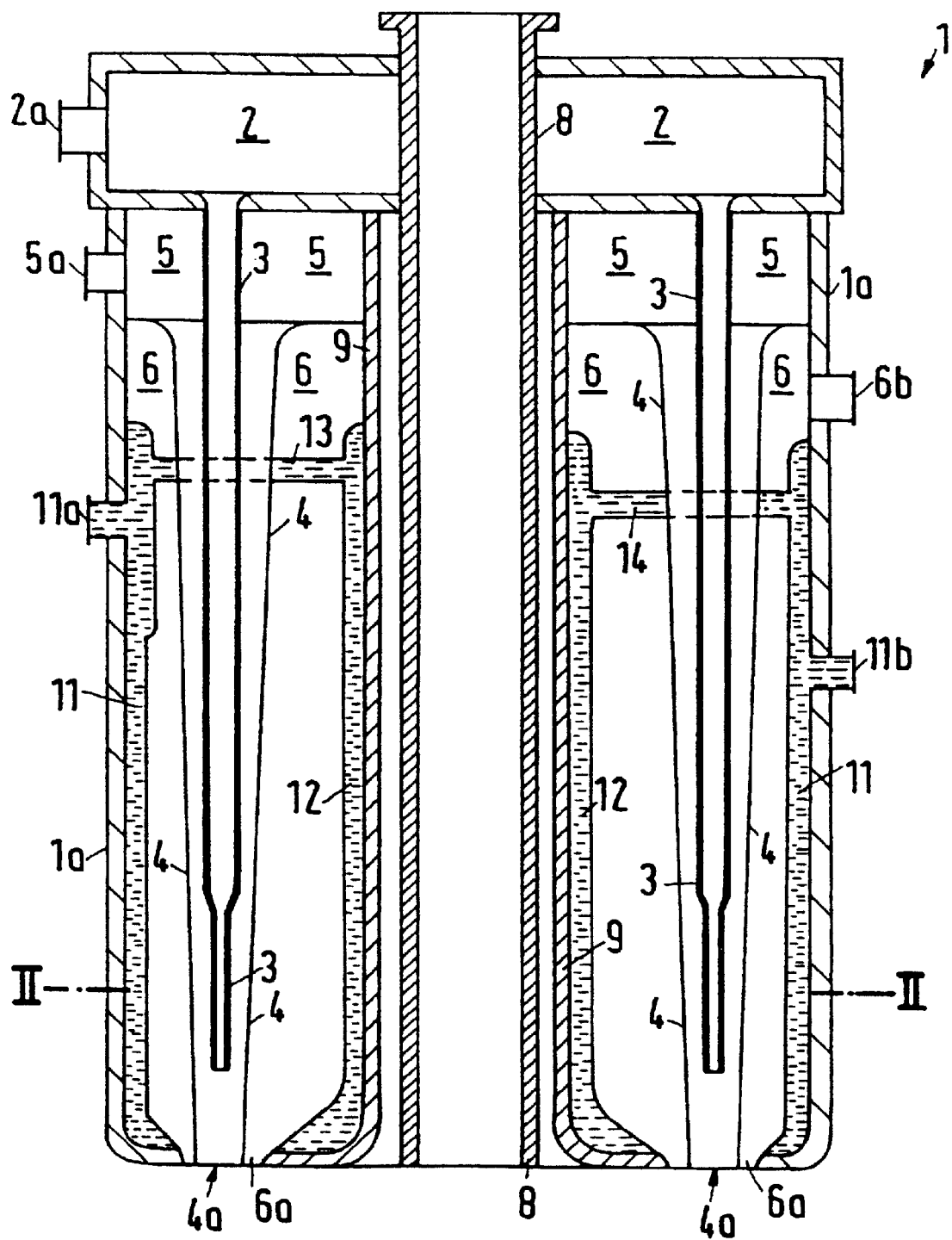

This invention relates to a burner for the partial oxidation of liquid, carbonaceous fuel by means of steam and an oxygen-containing gas.

Burners of this kind, which are directed into a combustion chamber, are known for instance from EP 0 127 273 B1, the U.S. Pat. No. 4,933,163 and EP 0 707 880 A1. From the last-mentioned publication it is also known to dispose such burner at the entrance of an empty combustion chamber, the raw product gas produced being cleaned subsequently and being processed for instance to obtain a synthesis gas.

It is the object underlying the invention to create a burner for the partial oxidation of liquid fuels such as heavy oil, which burner is suited for high throughput capacities and at the same time allows an inexpensive operation. In accordance with the invention this is achieved in that at least two fuel-carrying tubes are arranged in parallel, the distance between adjacent, fuel-carrying tubes being 5 to 30 cm, that each fuel-carrying tube is surrounded by a steam-carrying tube, that the orifice end of each steam-carrying tube has a supply line for oxygen-containing gas, and that the steam-carrying tubes are surrounded by a common first cooling chamber through which cooling liquid is passed, the first cooling chamber constituting an annular chamber and extending into the area of the orifice ends of the steam-carrying tubes. The number of fuel-carrying tubes usually lies in the range from 2 to 20 and preferably from 3 to 12.

Due to the common first cooling chamber a compact, relatively simple construction of the burner is obtained, at the same time a sufficient cooling of the area of the orifice ends of the steam-carrying tubes is ensured, which tubes are exposed to the high temperatures in the combustion chamber. At the point where the oxygen-containing gas meets the fuel local temperatures up to about 1700° C. occur. Coaxial to the first cooling chamber a common second cooling chamber is expediently provided, which is surrounded by the first cooling chamber. It may be recommended to provide a connecting passage for cooling liquid between the first and the second cooling chamber.

A further development of the burner consists in that inside the area of the first cooling chamber at least one passage for an insertable and removable auxiliary burner is provided. This auxiliary burner may be used for instance only in the start-up phase of the gasification operation, and it is removed from the burner assembly during the continuous operation.

As liquid, carbonaceous fuel there may for instance be used heavy oil, a pumpable slurry of granular coal or petroleum coke in water or in liquid hydrocarbons, as well as an emulsion of bitumen or asphalt in water. As $O_2$-containing gas there is normally used technically pure oxygen or oxygen-enriched air, if the nitrogen content is not disturbing.

Figure 2:
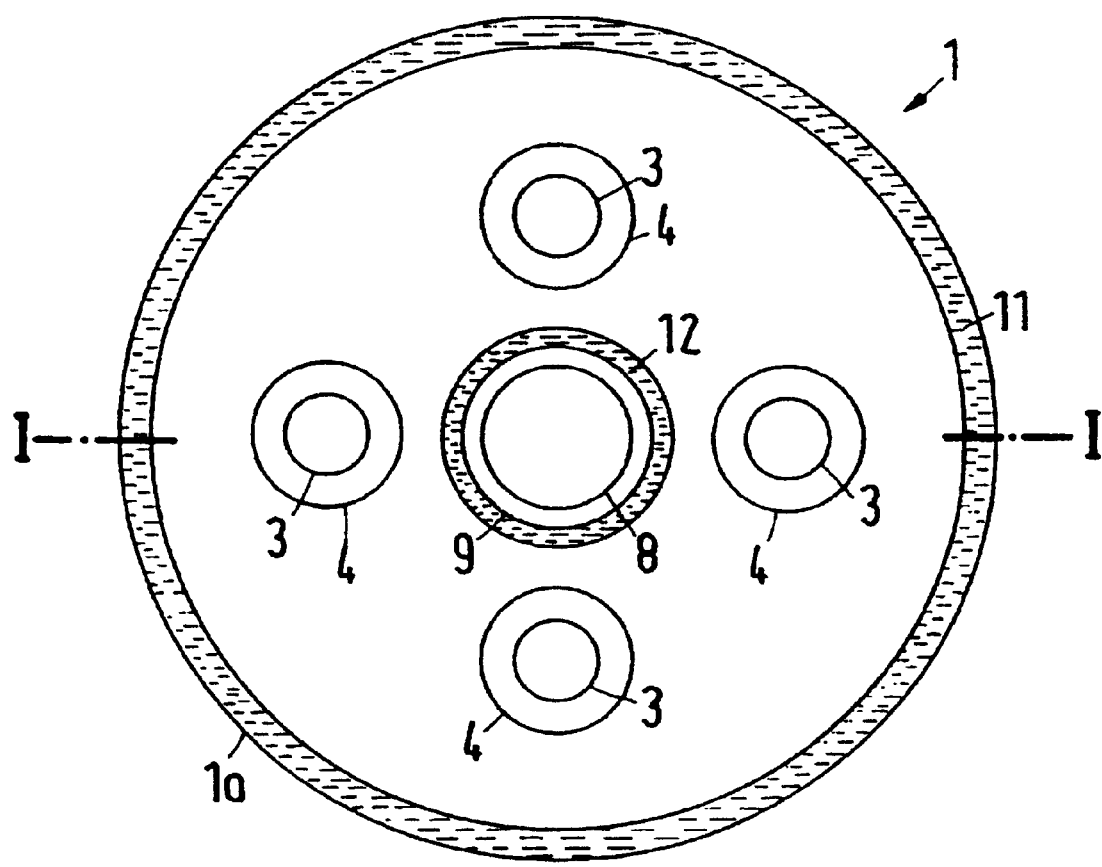

Embodiments of the burner will be explained with reference to the drawing, wherein:

FIG. 1 shows a longitudinal section through the burner in a schematic representation, sectioned along line I—I of FIG. 2, and FIG. 2 shows a cross-section through the burner of FIG. 1, section ed along line II—II.

The burner 1 has a distribution chamber 2 for liquid fuel, here also referred to as first distribution chamber. The liquid fuel is supplied through the inletport 2a and pressed out through the fuel-carrying tubes 3. In the present case, four fuel-carrying tubes 3 are connected with the distribution chamber 2, cf. FIG. 2, of which tubes two are shown in FIG. 1. Each tube 3 is coaxially surrounded by a steam-carrying tube 4. The conically tapered shape of the tubes 4 towards the orifice end 4a is not absolutely necessary. The steam is supplied through an inlet 5a and first of all enters a second distribution chamber 5, before it flows out through the tubes 4. In the orifice area 4a atomized fuel and steam are mixed before the mixture leaves the burner. Through annular slots 6a oxygen-containing gas is supplied to the mixture, which gas is required for partial oxidation. The oxygen-containing gas comes from a third distribution chamber 6 and is supplied through the inlet port 6b.

In the central area of the burner 1 a cylindrical passage 8 is provided, into which e.g. an auxiliary burner, for instance for the start-up phase, can be inserted if necessary. When the auxiliary burner is no longer used, it can be removed from the passage 8, and the passage can be sealed by means of a lid not represented. The passage 8 is surrounded by a cylindrical wall 9, which is in contact with a cooling chamber 12. The cooling chamber 12, which constitutes an annular chamber and surrounds the passage 8 and the cylinder wall 9, is referred to as second cooling chamber. The first cooling chamber 11 rests against the inside of the burner housing 1a, which for instance has a cylindrical shape. The cooling liquid, e.g. water, is supplied through the inlet 11a and is discharged through the outlet 11b. Between the first cooling chamber 11 and the second cooling chamber 12 the two connecting passages 13 and 14 are provided, which each extend past a steam-carrying tube 4. For a better optical clarity the parts of the burner through which cooling liquid flows are represented with dots. By means of not represented flow obstacles in the cooling chambers it is ensured that the cooling liquid preferably takes a flow path as it is necessary for the desired temperatures. It is in particular ensured that the cooling effect also sufficiently exists in the vicinity of the orifice area 4a of the burner.

In the drawing, which represents the burner only schematically, spacers between the various parts were omitted, so as not to impair the clarity of the representation.

In the present case, four fuel-carrying tubes 3 and the associated steam-carrying tubes 4 are disposed inside the first cooling chamber 11, but the number of the tubes 3 with the associated tubes 4 can lie in the range between 2 and 20 and preferably 3 and 12. It may be recommended to dispose these tubes in the area between the first and the second cooling chamber, and to provide a passage 8 for the auxiliary burner in the central area. This passage 8 is, however, not necessary in all cases.

What is claimed is:

1. A burner for the partial oxidation of liquid, carbonaceous fuel by means of steam and an oxygen-containing gas, comprising at least two fuel-carrying tubes approximately disposed in parallel, the distance between adjacent fuel-carrying tubes being 5 to 30 cm, wherein each fuel-carrying tube is surrounded by a steam-carrying tube, and each steam-carrying tube has a supply line for oxygen-containing gas at its orifice end, and the steam-carrying tubes are surrounded by a common first cooling chamber through which cooling liquid is passed, the first cooling chamber constituting an annular chamber and extending into the area of the orifice ends of the steam-carrying tubes, wherein there is provided at least one passage for an insertable and removable auxiliary burner.

2. The burner as claimed in claim 1, wherein coaxial to the first cooling chamber a common second cooling chamber is disposed, which is surrounded by the first cooling chamber.

3. The burner as claimed in claim 2, wherein between the first and the second cooling chamber at least one connecting passage for cooling liquid is provided.

4. The burner as claimed in claim 1 wherein a first distribution chamber for liquid fuel is provided, with which the furl-carrying tubes are connected.

5. The burner as claimed in claim 1 wherein a second distribution chamber for steam is provided, with which the steam-carrying tubes are connected.

6. The burner as claimed in claim 1, wherein a third distribution chamber for oxygen-containing gas is provided, with which the supply lines for oxygen-containing gas are connected.

7. The burner as claimed in claim 4, the wherein passage for the auxiliary burner is surrounded by the second cooling chamber.

* * * * *

UNITED STATES PATENT AND TRADEMARK OFFICE
CERTIFICATE OF CORRECTION

PATENT NO. : 6,652,267 B1
DATED : November 25, 2003
INVENTOR(S) : Brehm et al.

It is certified that error appears in the above-identified patent and that said Letters Patent is hereby corrected as shown below:

Column 3,
Line 6, "furl-carrying" should read -- fuel-carrying --

Column 4,
Line 5, "the wherein passage" should read -- wherein the passage --

Signed and Sealed this

Fifteenth Day of March, 2005

JON W. DUDAS
*Director of the United States Patent and Trademark Office*